United States Patent
Howard

[19]

[11] Patent Number: 5,862,658
[45] Date of Patent: Jan. 26, 1999

[54] GRASS REMOVER FOR TERMITE BAIT STATION

[76] Inventor: Steven J. Howard, 7254 S. Dennis Blvd., Broken Arrow, Okla. 74014

[21] Appl. No.: 18,544

[22] Filed: Feb. 4, 1998

[51] Int. Cl.⁶ .................. A01D 34/84; A01B 33/06
[52] U.S. Cl. .................. 56/239; 30/276; 30/301; 30/347; 30/500; 172/111; 56/DIG. 9
[58] Field of Search .............. 56/239, 289, DIG. 9, 56/DIG. 17; 30/276, 301, 347, 500

[56] References Cited

U.S. PATENT DOCUMENTS

| | | | |
|---|---|---|---|
| 1,480,151 | 6/1924 | Cosman | 30/300 |
| 2,670,537 | 3/1954 | Campbell | 30/300 |
| 2,968,903 | 1/1961 | Kesling | 56/25.4 |
| 3,017,733 | 1/1962 | Evans | 56/25.4 |
| 3,110,997 | 11/1963 | McClain | 56/25.4 |
| 3,657,814 | 4/1972 | Bohlman | 30/302 |
| 3,960,218 | 6/1976 | Atchley et al. | 172/13 |
| 4,068,377 | 1/1978 | Kimmel et al. | 30/276 |
| 4,202,094 | 5/1980 | Kalmar | 30/276 |
| 4,317,282 | 3/1982 | Pace | 30/122 |
| 4,720,219 | 1/1988 | Masonek et al. | 408/201 |
| 4,845,929 | 7/1989 | Kawasaki | 56/17.5 |
| 4,862,682 | 9/1989 | Wait et al. | 56/255 |
| 5,810,093 | 9/1998 | Howard | 172/111 |

*Primary Examiner*—Thomas B. Will
*Assistant Examiner*—Arpad Fabian Kovacs
*Attorney, Agent, or Firm*—John D. Gassett

[57] ABSTRACT

This is a grass remover to remove grass from the surface of an area in a circular path about the top of a guide hole in which a termite bait station may be inserted. This includes a circular skirt with a hub in the middle and a plurality of cutting blades sharpened at the lower end and carried between the hub and the skirt. A guide cylinder is fixed to the hub and extends downwardly into the guide hole. A stem extends upwardly from the hub and is of a character to fit into the chuck of a hand drill. Operation of the hand drill when the guide cylinder is in the guide hole causes the grass to be removed from the circular area about the top of the guide hole.

7 Claims, 3 Drawing Sheets

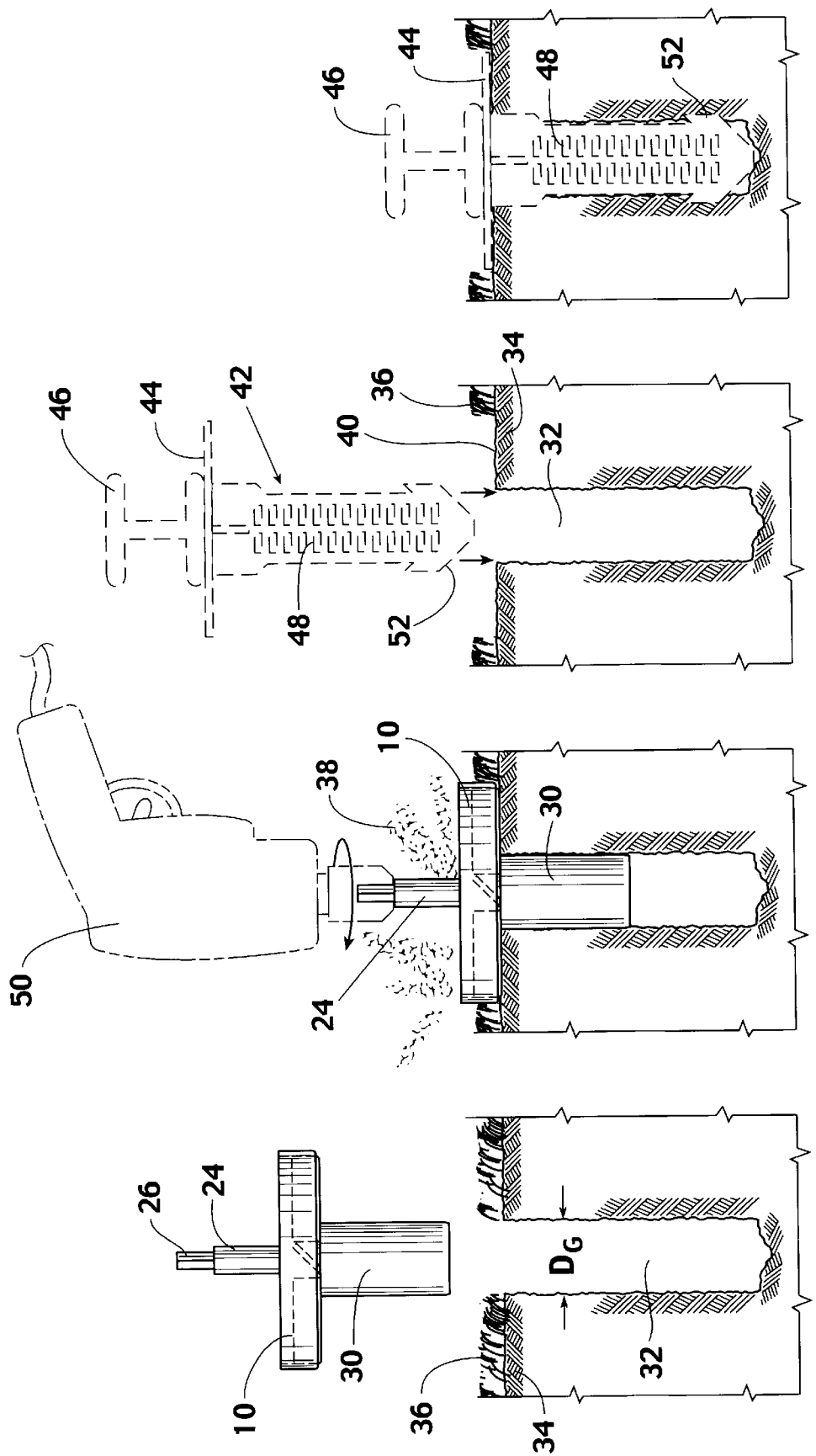

GRASS REMOVER FOR TERMITE BAIT STATION

This invention relates to a tool for cutting grass down to the dirt in an area about a hole drilled in a lawn.

BACKGROUND OF THE INVENTION

This invention has to do with the application or use of Sentricon bait stations manufactured by Dow Elanco by termite exterminators. A series of holes is drilled around the house or structure to be treated for termites. These holes are typically two inches in diameter and about fourteen inches deep. A "bait station" is to be inserted in these holes. A typical bait station has a cylinder containing the desired termite chemical. The cylinder is inserted into the hole. At the top of the cylinder is a flat circular support plate which rests on the earth and supports the termite cylinder within the hole.

Before the bait station is inserted into the hole the grass must be cut off at the surface down to dirt in an area around the hole. This cutting is presently done by hand cutters in the support area on which the support plate will rest.

It is an object of this invention to provide a tool which will properly cut the grass from this support area.

BRIEF SUMMARY OF THE INVENTION

This concerns a tool for use in the application of termite exterminating chemicals around a structure to be protected from termites. In this method at least one guide hole is drilled into the ground around the structure to be protected from termites.

This invention provides a grass remover for removing the grass in the support area about the top of the guide hole. The grass remover has a circular skirt, a hub at the center of the skirt and cutter blades secured between the hub and the interior of the skirt. These blades extend down to the bottom of the skirt and preferably a short distance below. A guide cylinder is supported beneath and from the hub. During operation the guide cylinder is placed into the hole for the bait station. A power stem extends upwardly from the hub and rotation of the hub rotate the grass remover.

Once the guide cylinder is in place a power source such as a drill bit motor is attached to a stem which rotates the grass remover including the cylindrical skirt and cutter blades. When it rotates the cylindrical skirt it causes the cutter blade to cut the grass down to the dirt. The grass is quickly cut off of this support area and the cut grass removed. The bait station is then placed into the guide holes with the support plates resting on the support area which has the grass removed. It is necessary to remove the grass in order to get a firm surface for the support plate of the bait station.

Further objects and a better understanding of the invention will be obtained from the following description taken in conjunction with the drawings in which:

BRIEF DESCRIPTION OF THE DRAWINGS

FIGS. 4, 5, 6 and 7 illustrate the sequence of steps in removing grass from the top of the soil adjacent the pre-drilled guide holes and installing the bait station, wherein, FIG. 4 illustrates the grass remover of FIG. 1 positioned just above the guide hole;

FIG. 5 illustrates the tool being positioned in the guide hole and powered by an ordinary electrical hand drill;

FIG. 6 illustrates the bait station positioned just above the guide hole; and

FIG. 7 illustrates the bait station after it is placed in the guide hole.

DESCRIPTION OF THE PREFERRED EMBODIMENT

Figure 1:
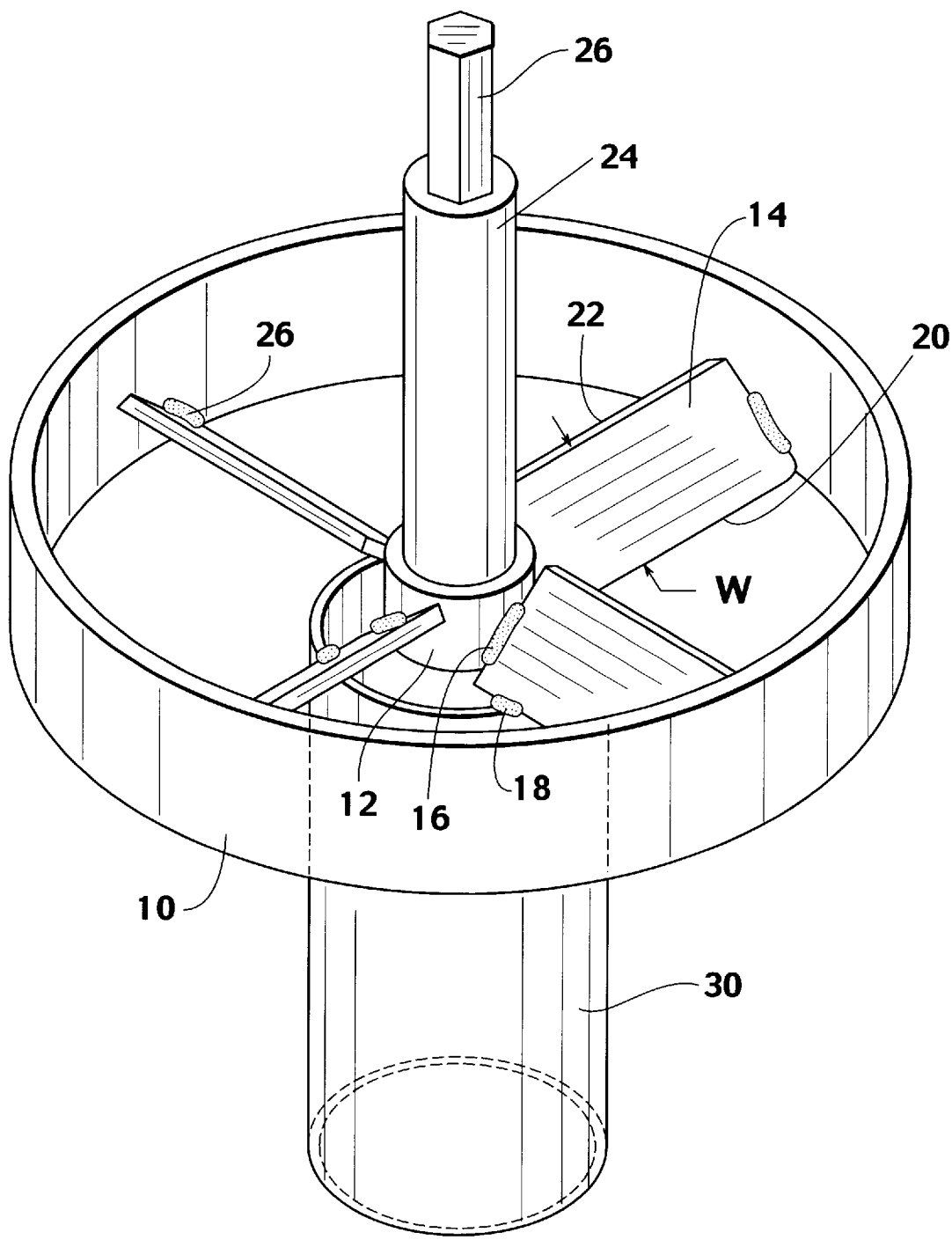
FIG. 1 is an isometric view showing the "Grass Remover for Termite Bait Station"

Attention is first directed to FIG. 1 which shows in isometric form the grass remover of this invention. Shown thereon is a circular skirt 10 and a hub 12 in the center of the circular skirt. A plurality of blades 14 (in this case four as shown) are connected at the outer end to the inner side of circular skirt 10 by weld 26 and at the inner end they are secured to the hub 12 by weld 16. These blades each have an upper edge 22 and a cutting edge 20 on the low edge of the blade. Although not limited to this, in the one shown the blades 14 make an angle of about 45 degrees with the vertical with the tool in the upright position as shown. Other angles could be used so long as the cutting edge is positioned to be able to cut the grass. The blades are preferably positioned so that in operation they throw the cut grass out of the circular skirt 10. In operation, this would leave a circular support area 40 (FIG. 6) with the grass completely removed down to the dirt.

A guide cylinder 30 is secured below the hub 12 and is preferably secured by welds 18 which connects the upper end of the guide cylinder to the cutting blades 14.

A stem 24 is connected such as by welding to hub 12 and extends up above the top of the circular skirt 10. A fitting 26 is provided at the upper end of the stem 24 and is of the size and shape to be inserted into the chuck of a drill when used for rotating the device.

Figure 2:
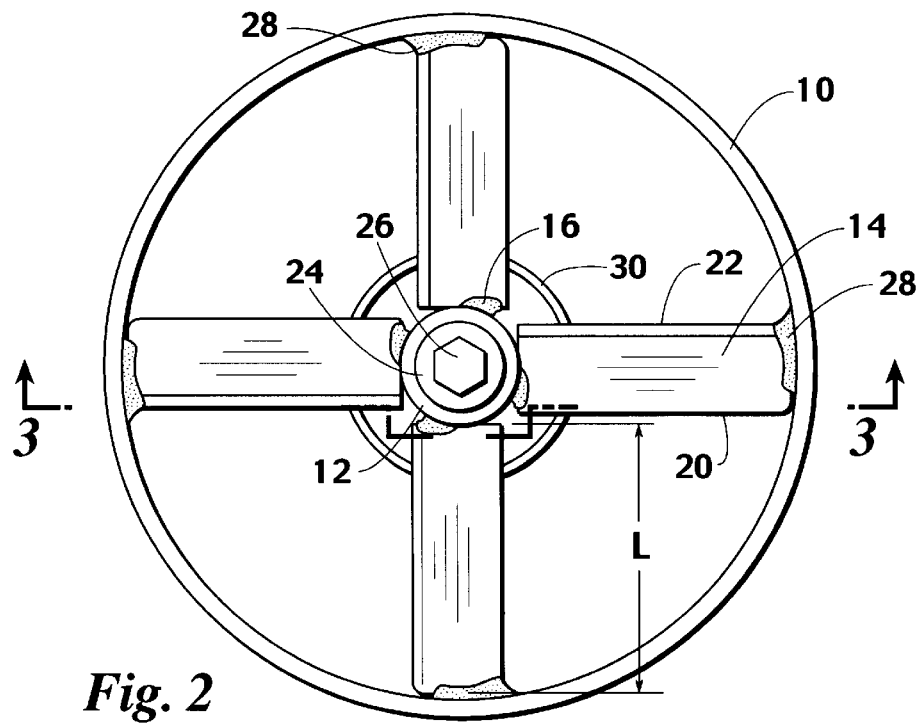
FIG. 2 is a top view of the grass remover of FIG. 1.
Figure 3:
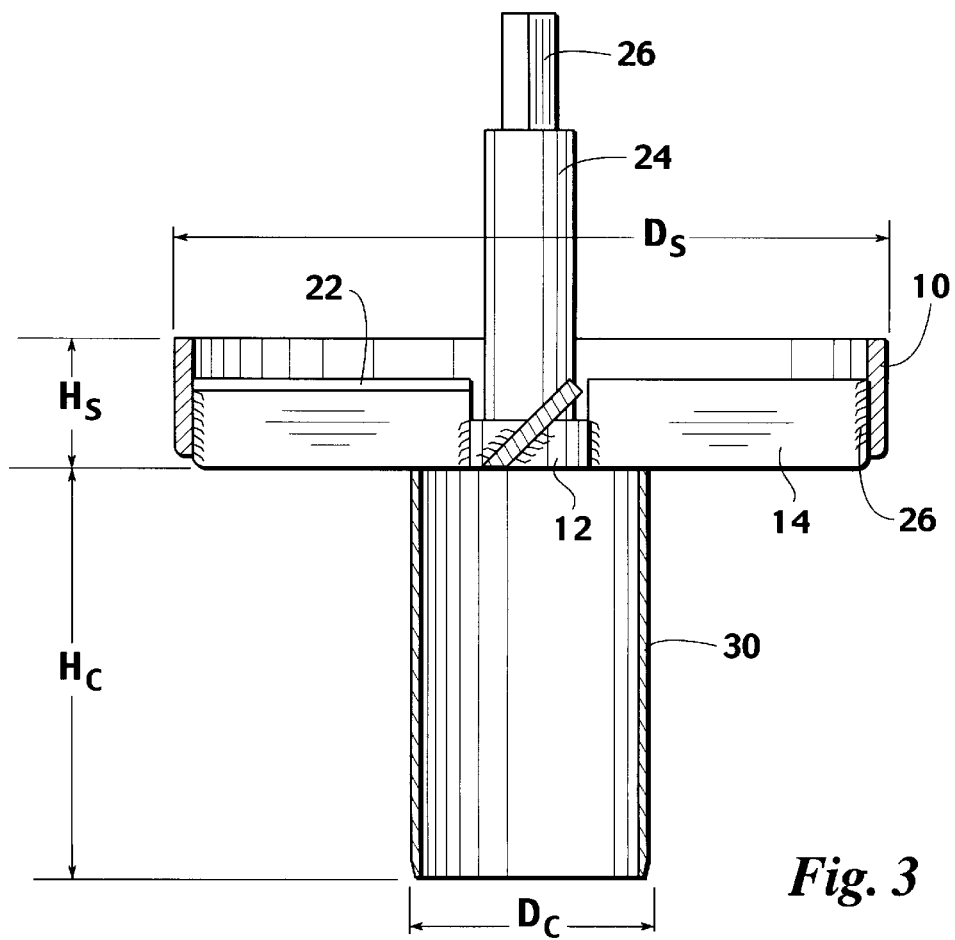
FIG. 3 is a view taken along the line 3—3 of FIG. 2.

FIG. 2 is a top view of the device of FIG. 1 and FIG. 3 is a view taken along the line 3—3 of FIG. 2. FIGS. 2 and 3 are helpful in further understanding the description given above in regard to FIG. 1.

Attention is now directed to FIGS. 4 and 5 to illustrate the use of the device in FIGS. 1, 2 and 3 to cut a support area in the grass at the top of the guide hole 32. When it is desired to use a bait station 42 as illustrated in FIGS. 6 and 7, normally a plurality of guide holes 32 are drilled about the structure to be protected from termites. These guide holes are typically two inches in diameter and about fourteen inches deep. A bait station 42 is to be inserted in these holes. A "bait station" is generally considered to be a structure, such as a cylinder, for holding a chemical for treating area subject to termite infestation. A very effective bait station is identified as Sentricon System and is commercially available and is manufactured by Dow Elanco, 9330 Zionsville Road, Indianapolis, Ind. 46268-1054.

As shown in FIG. 4, the grass remover is positioned just above the drill hole 32 which will later receive a bait station 42. In FIG. 5 a power means such as an ordinary electric or gas powered hand drill 50 has received fitting 26. The drill is then energized. This causes the grass removing tool shown in FIG. 1 to rotate. It is held in position in the guide hole by having a reasonably close fit between the guide cylinder 30 and the guide hole 32. When the blades 24 have cut the grass down to the dirt to form a grass free support area (FIG. 6), the grass removing tool is removed from the hole. Normally, rotation of the blades and at a 45 degree angle will throw most of the cut grass out of the interior of the circular skirt 10. Thus, there is a circular support area 40 as shown in FIG. 6 in which the grass has all been removed from the top of the soil or dirt around the hole 32. The grass is removed from an area of approximately the same size as the support disk 44 of the bait station 42. Typically, the support pad 44 is about six inches in diameter. It is important that the grass is cut down to dirt and removed disk 44 can stabilize the top of the bait station 42.

A grass remover as described above has been built and operates quite successfully. The grass remover tool was made primarily out of steel and welded together as indicated above. The circular skirt 10 has a diameter $D_S$ of approximately six inches and a height $H_s$ of about two inches. The blades 14 had a width W of about one inch and a length L of about 2¼ inches. The guide cylinder 30 had a height $H_c$ at a diameter $D_c$ of about two inches. This worked real well for use with the basic invention such as described above.

The following are the relationships between the dimensions that are believed to be useful. $D_S$, is typically about two to four times $D_C$ and $H_C$ may be in the range of 1.5 to three times $H_S$. These limitations are not intended to limit the broad concept but outline ranges of relationships which are considered practical.

Thus, it is apparent that there has been provided, in accordance with the invention, a grass remover for termite bait station. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of application of termite exterminators around a structure which comprises the steps of:

drilling at least one guide hole into the ground having a depth of L and a diameter of $D_H$;

obtaining a grass remover having a skirt of a diameter $D_S$ and a height of $H_S$, a guide cylinder supported beneath said skirt and having a diameter of $D_C$ and a height $H_C$, and a grass cutter supported within said skirt;

placing said guide cylinder in said hole;

rotating said grass remover to cut the grass from around the top of said hole;

and thereafter placing a bait station in said hole.

2. A method as defined in claim 1 in which $D_S$ is about two to four times $D_C$.

3. A method as defined in claim 1 in which $H_c$ is 1.5 to 3 times $H_S$.

4. A grass remover for terminate bait stations placed in a guide hole in the ground comprising:

a hub;

a plurality of cutters cutting blades having a length $R_c$ outwardly from said hub;

a guide cylinder having a radius less than $R_c$ for insertion into said guide hole and supported from said hub, a stem extending from said hub in the opposite direction of said guide cylinder and of a character to be turned by power source to rotate said cutting blades.

5. A grass remover for a termite bait station to be anchored in a guide hole drilled in the earth comprising:

a cylindrical skirt having a diameter of $D_S$ and a height $H_S$;

a hub at the center of said skirt;

cutter blades secured between said hub and the interior of said skirt;

a guide cylinder supported beneath said hub for placing into said guide hole and having a height $H_C$ and a diameter $D_C$ in which $D_c$, is less than $D_s$.

6. A grass remover as defined in claim 5 in which the blades are set at an angle with the plane of the bottom of said skirt and with the bottom edge sharpened for cutting grass and in which $H_C$ is at least 1.5 times $H_S$.

7. A grass remover for a termite bait station insertable into a guide hole having a diameter $D_G$ and a depth $H_G$ which comprises:

a circular skirt having a bottom edge and a diameter $D_S$ and a height $H_S$;

a hub having a diameter $D_c$ and positioned within said skirt;

a plurality of cutting blades sharpened at the lower end and carried between said hub and said skirt and extending at least to the bottom edge of said skirt;

a guide cylinder fixed to said hub at the lower edge of said cuter blades and extending downwardly a distance of $H_C$ which is greater than $H_S$ and having a diameter not over that of the diameter of said guide hole;

a stem attached to said hub and extending in the opposite side of said skirt then the side on which said guide cylinder is and of a character to be rotated by a power tool.

* * * * *